United States Patent
Yamamoto (10) Patent No.: US 9,477,915 B2
(45) Date of Patent: Oct. 25, 2016

(54) PRINT CONTROL APPARATUS, METHOD FOR CONTROLLING PRINT APPARATUS, AND STORAGE MEDIUM, WITH NOTIFICATION OF ROTATION RESULT

(71) Applicant: CANON KABUSHIKI KAISHA, Tokyo (JP)

(72) Inventor: Noriyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/666,843

(22) Filed: Mar. 24, 2015

(65) Prior Publication Data

US 2015/0278660 A1   Oct. 1, 2015

(30) Foreign Application Priority Data

Apr. 1, 2014 (JP) ................. 2014-075542

(51) Int. Cl.
 G06K 15/02 (2006.01)
 G06K 15/00 (2006.01)
 G06F 3/12 (2006.01)

(52) U.S. Cl.
 CPC .............. *G06K 15/402* (2013.01); *G06F 3/12* (2013.01)

(58) Field of Classification Search
 None
 See application file for complete search history.

(56) References Cited

U.S. PATENT DOCUMENTS

| | | | |
|---|---|---|---|
| 2007/0013935 A1* | 1/2007 | Uchida | G06F 3/1204 358/1.13 |
| 2009/0237712 A1* | 9/2009 | Shirai | H04N 1/2384 358/1.15 |
| 2010/0231960 A1* | 9/2010 | Kurata | G06F 3/1219 358/1.15 |

FOREIGN PATENT DOCUMENTS

JP   02-272620 A   11/1990

\* cited by examiner

*Primary Examiner* — Andrew H Lam
(74) *Attorney, Agent, or Firm* — Fitzpatrick, Cella, Harper & Scinto (57) ABSTRACT

There are provided a print control apparatus in which a load on a user can be lightened by reporting information on necessary processing, a method for controlling a print apparatus, and a print medium. A print control apparatus for controlling a print apparatus to print an image based on print data, the print control apparatus includes: a determination unit configured to determine whether a size of a sheet set in the print apparatus and a size of the print data match; an acquisition unit configured to acquire information on processing needed to adjust the size of the print data to be closer to the size of the sheet in a case where it is determined that the size of the sheet and the size of the print data do not match; and a notifying unit configured to notify a user of information acquired by the acquisition unit.

18 Claims, 12 Drawing Sheets

| DETERMINATION RESULT | MEANING |
|---|---|
| (A) | PRINTING IS NOT POSSIBLE BECAUSE SHEET IS NOT SET IN PRINT APPARATUS |
| (B) | PRINTING IS POSSIBLE, BUT MARGIN IS PRODUCED. |
| (C) | PRINTING IS POSSIBLE, AND NO MARGIN IS PRODUCED. |
| (D) | PRINTING IS NOT POSSIBLE BECAUSE WIDTH OF SHEET SET IN PRINT APPARATUS IS TOO SMALL. |

| DETERMINATION RESULT BEFORE PRINT SETTINGS ARE CHANGED | DETERMINATION RESULT INFORMATION BEFORE PRINT SETTINGS ARE CHANGED |
|---|---|
| A | SHEET IS NOT SET |
| B | PRINTING IS POSSIBLE, BUT MARGIN IS PRODUCED. |
| C | PRINTING WITHOUT MARGINS IS POSSIBLE |
| D | PRINTING IS NOT POSSIBLE |

FIG.9A

| DETERMINATION RESULT BEFORE PRINT SETTING OF ROTATION IS CHANGED | DETERMINATION RESULT AFTER PRINT SETTING OF ROTATION IS CHANGED | DETERMINATION RESULT INFORMATION AFTER PRINT SETTING OF ROTATION IS CHANGED |
|---|---|---|
| A | – | (NO MESSAGE) |
| B | B <IF MARGIN BEFORE CHANGE IS GREATER THAN OR EQUAL TO MARGIN AFTER CHANGE> | ROTATION CANNOT REMOVE MARGINS (ROTATION CANNOT REDUCE PAPER CONSUMPTION) |
| B | B <IF MARGIN BEFORE CHANGE IS LESS THAN MARGIN AFTER CHANGE> | ROTATION CAN REDUCE PAPER CONSUMPTION |
| B | C | ROTATION ALLOWS PRINTING WITHOUT MARGINS |
| B | D | ROTATION MAKES PRINTING IMPOSSIBLE |
| C | B | ROTATION PRODUCES MARGINS |
| C | C | ROTATION STILL ALLOWS PRINTING WITHOUT MARGINS |
| C | D | ROTATION MAKES PRINTING IMPOSSIBLE |
| D | B | ROTATION ALLOWS PRINTING WITH MARGINS |
| D | C | ROTATION ALLOWS PRINTING WITHOUT MARGINS |

FIG.9B

| RELATIONSHIP BETWEEN SHEET WIDTH AND OUTPUT SIZE | DETERMINATION RESULT INFORMATION ON PRINT SETTING OF ENLARGEMENT/REDUCTION |
|---|---|
| SHEET WIDTH AND OUTPUT SIZE WIDTH ARE THE SAME | (NO MESSAGE) |
| SHEET WIDTH AND OUTPUT SIZE WIDTH ARE DIFFERENT | ENLARGEMENT OR REDUCTION TO <SCALING FACTOR>% ALLOWS PRINTING WITHOUT MARGINS. ENLARGEMENT MAY CAUSE POOR IMAGE QUALITY. |

PRINT CONTROL APPARATUS, METHOD FOR CONTROLLING PRINT APPARATUS, AND STORAGE MEDIUM, WITH NOTIFICATION OF ROTATION RESULT

BACKGROUND OF THE INVENTION

1. Field of the Invention

The present invention relates to a print control apparatus, a method for controlling a print apparatus, and a storage medium.

2. Description of the Related Art

There is known a print system in which a print control apparatus is connected to a print apparatus, and printing is performed in the print apparatus based on print data transmitted from the print control apparatus. Japanese Patent Laid-Open No. H02-272620(1990) discloses a print system configured to determine a paper size needed for printing print data and use a print apparatus in which paper having the determined size is set to print an image on the paper.

According to the print system of Japanese Patent Laid-Open No. H02-272620(1990), however, even if changing the print settings of an original, such as a scaling factor, makes it possible to print as desired, such information will not be shown to users, and therefore the users themselves need to consider and appropriately adjust the print settings. This puts a load on the users.

SUMMARY OF THE INVENTION

The present invention provides a print control apparatus in which a load on a user can be lightened by reporting information on necessary processing, a method for controlling a print apparatus, and a storage medium.

According to a first aspect of the present invention, there is provided a print control apparatus for controlling a print apparatus to print an image based on print data, the apparatus including: a determination unit configured to determine whether a size of a sheet set in the print apparatus and a size of the print data match; an acquisition unit configured to acquire information on processing needed to adjust the size of the print data to be closer to the size of the sheet in a case where it is determined that the size of the sheet and the size of the print data do not match; and a notifying unit configured to notify a user of information acquired by the acquisition unit.

According to a second aspect of the present invention, there is provided a storage medium for storing a program for causing a computer function as a print control apparatus, the program for causing the computer to: determine whether a size of a sheet set in a print apparatus for printing an image based on print data and a size of the print data match; acquire information on processing needed to adjust the size of the print data to be closer to the size of the sheet in a case where it is determined that the size of the sheet and the size of the print data do not match; and notify a user of information acquired in the acquiring step.

According to a third aspect of the present invention, there is provided a method for controlling a print apparatus printing an image based on print data, the method including the steps of: determining whether a size of a sheet set in the print apparatus and a size of the print data match; acquiring information on processing needed to adjust the size of the print data to be closer to the size of the sheet in a case where it is determined that the size of the sheet and the size of the print data do not match; and notifying a user of information acquired in the acquiring step.

According to the above configuration, it is possible to lighten the load on a user by reporting information on necessary processing.

Further features of the present invention will become apparent from the following description of exemplary embodiments (with reference to the attached drawings).

DESCRIPTION OF THE EMBODIMENTS

Embodiments of the present invention will now be described with reference to the attached drawings.

First Embodiment

Figure 1:
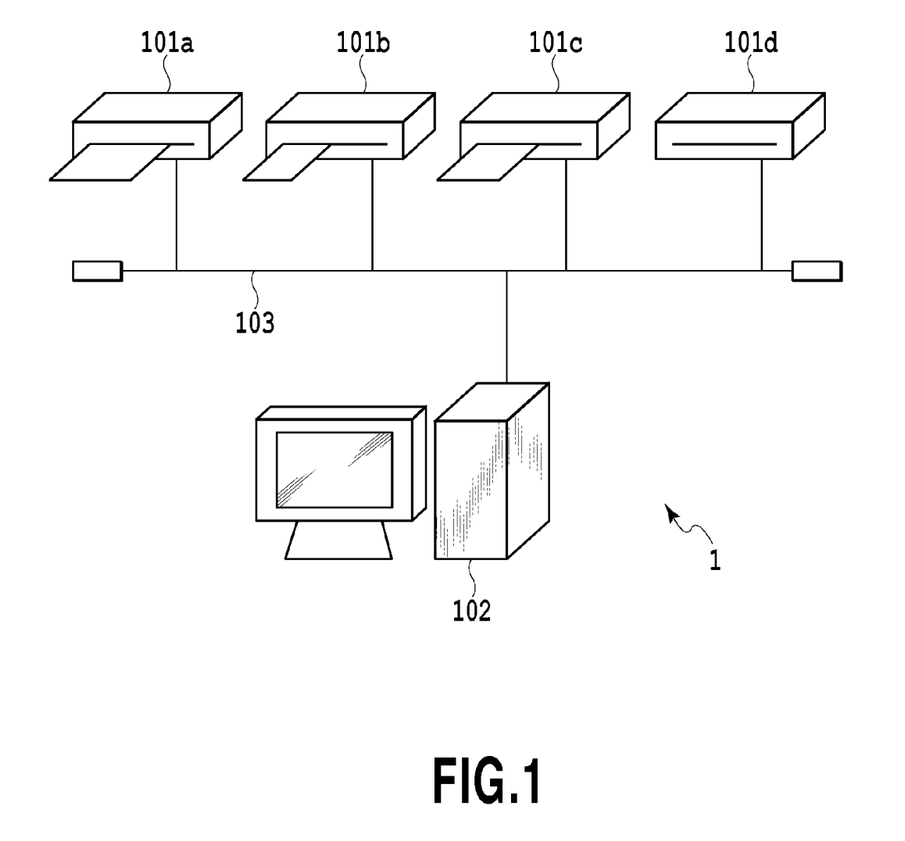
FIG. 1 is a schematic diagram showing a system configuration of a print system.

FIG. 1 is a diagram showing a system configuration of a print system 1 according to the present embodiment. As shown in FIG. 1, the print system 1 includes a host device (print control apparatus) 102, print apparatuses 101a to 101d, and a network cable 103 connecting the host device 102 and the print apparatuses 101a to 101d.

The host device 102 transmits print data to the print apparatuses 101a to 101d according to a print instruction given by a user. The print apparatuses 101a to 101d print an image based on the received print data. In the present embodiment, an Ethernet (a registered trademark) cable (IEEE802.3) is used as the network cable 103. However, the host device 102 and the print apparatuses 101a to 101d may be connected via other communication standards (such as USB, IEEE1284, and IEEE1394) and the like.

It should be noted that paper (sheet) having different sizes is respectively set in the print apparatuses 101a to 101d of the present embodiment. That is, in each of the print apparatuses 101a to 101d, paper having a single size is set.

Figure 2:
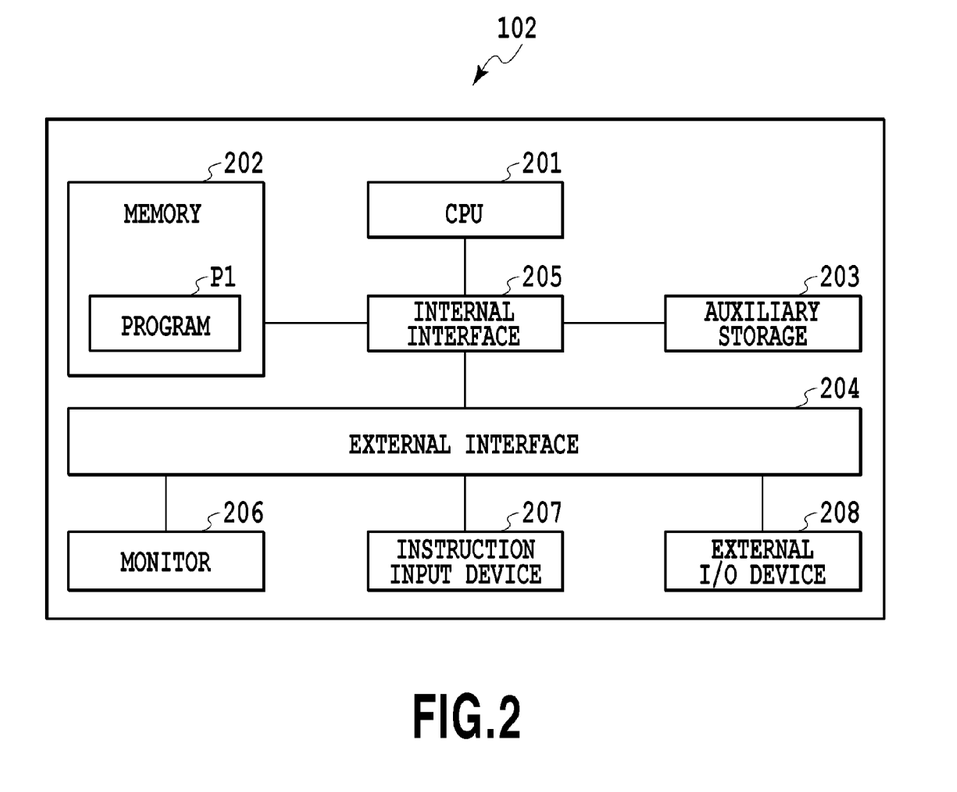
FIG. 2 is a block diagram showing an internal configuration of a host device.

FIG. 2 is a block diagram showing an internal configuration of the host device 102. As shown in FIG. 2, the host device 102 includes a CPU 201, a memory 202, an auxiliary storage 203, an external interface 204, an internal interface 205, a monitor 206, an instruction input device 207, and an external I/O device 208. The CPU 201, the memory 202, the auxiliary storage 203, and the external interface 204 are connected with each other via the internal interface 205. The monitor 206, the instruction input device 207, and the external I/O device 208 are connected via the external interface 204.

The CPU 201 sends processing instructions to each unit and performs various kinds of data processing and information processing to control the entire system. In the auxiliary storage 203, such as a hard disk drive, a programmed program P1 is stored in advance. In the auxiliary storage 203, tables which will be described later with reference to FIGS. 9A to 9C and information on paper set in the print apparatuses are also stored in advance. Regardless of whether the information on paper is stored in the auxiliary storage 203, the host device 102 may acquire the information from the print apparatuses by inquiring of the print apparatuses, and the information may be stored in the memory 202.

The program P1 to be executed is loaded into the memory 202. The control by the CPU 201 is performed according to the program P1.

The monitor 206 is a display unit such as a liquid crystal monitor and a CRT monitor, and displays operation instructions and results to a user. The instruction input device 207 is an input unit such as a keyboard and a mouse, and receives instructions/inputs from the user. The external I/O device 208 is a unit for receiving inputs from/sending outputs to the network cable 103.

Figure 3A:
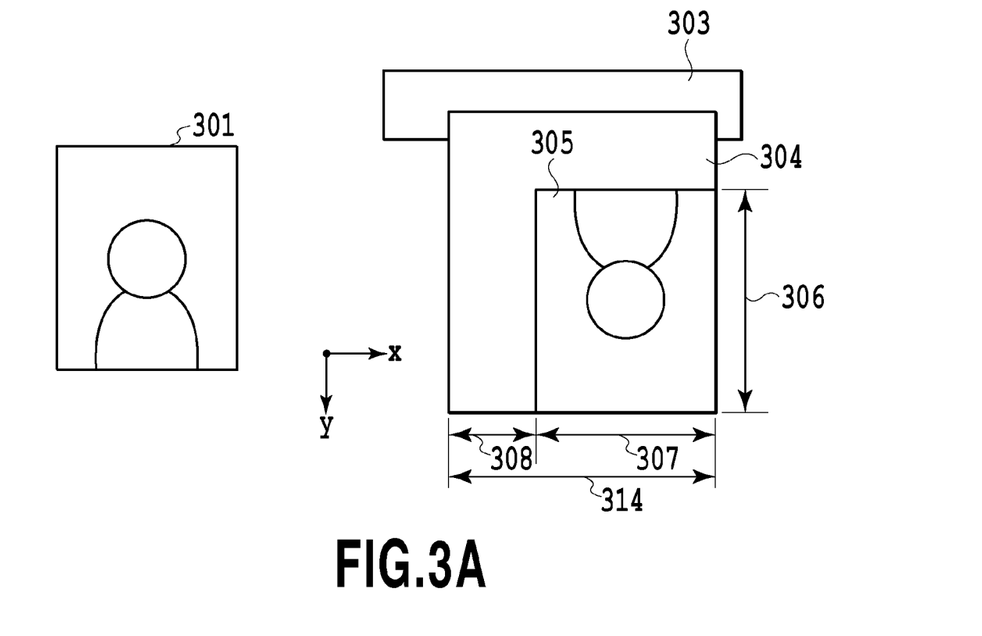
FIG. 3A is a diagram showing a print result in a print apparatus.
Figure 3B:
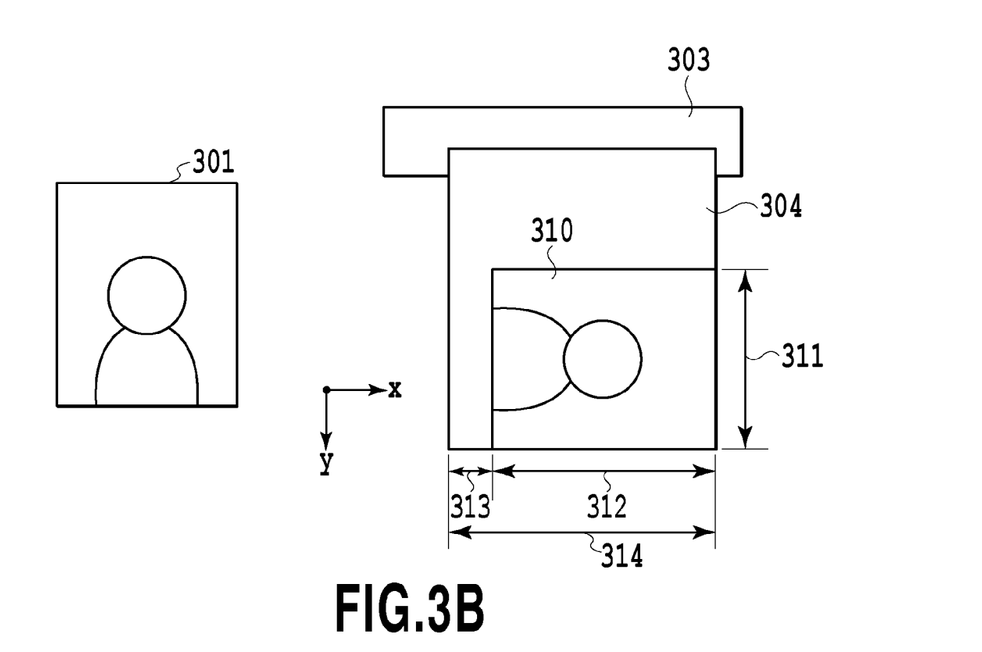
FIG. 3B is a diagram showing a print result in a print apparatus.

FIGS. 3A and 3B are diagrams showing print results of an original (manuscript) 301. FIG. 3A shows a print result 305 of printing the original 301 without rotation. FIG. 3B shows a print result 310 of printing the original 301 after rotation. Here, a sheet 304 has a length in a conveying direction in which the sheet 304 is conveyed (y direction shown in FIGS. 3A and 3B) and a length in x direction which crosses the y direction, and the lengths are called a height and a width, respectively.

As shown in FIG. 3A, in a case where the original 301 is printed without being rotated with respect to the sheet 304 in the print apparatus, the print result 305 of an output size width 307 and an output size height 306 is outputted. In this case, a margin width 308 is produced which is defined by subtracting the output size width 307 from a width 314 of the sheet 304. On the other hand, as shown in FIG. 3B, in a case where the original 301 is printed after being rotated with respect to the sheet 304 in the print apparatus 101, the print result 310 of an output size width 312 and an output size height 311 is outputted. In this case, a margin width 313 is produced which is defined by subtracting the output size width 312 from the width 314 of the sheet 304.

In comparison of FIG. 3A and FIG. 3B, the output size width 307 shown in FIG. 3A is smaller than the output size width 312 shown in FIG. 3B. Accordingly, the margin width 313 shown in FIG. 3B is smaller than the margin width 308 shown in FIG. 3A. In this manner, depending on the size of the original, rotating the original can reduce the area of margins, and effectively using paper can reduce paper consumption. It should be noted that for the sheet 304, roll paper, cut paper, or the like can be used. The roll paper is used in the present embodiment.

In the present embodiment, the user selects a print apparatus from a plurality of print apparatuses. The CPU 201 of the host device 102 determines whether printing without margins is possible by using the selected print apparatus. If printing without margins is not possible, a determination result information display screen is displayed on the monitor 206. If printing without margins is possible, a determination result information display screen is not displayed. If a print button 816 as shown in FIG. 4A (described later) is selected, in a case where printing without margins is possible, printing is performed, whereas in a case where printing without margins is not possible, a determination result information display screen 801 shown in FIG. 4B (described later) is displayed to provide determination result information for the user.

It should be noted that in the present embodiment, what is meant by the case where printing without margins is not possible is that the size of a sheet and the size of print data (more specifically, the size of an output product obtained by printing the print data of the original) do not match. Examples of the case where printing without margins is not possible include a case where print data cannot be printed because the sheet is not large enough to have the print data printed thereon.

Figure 4A:
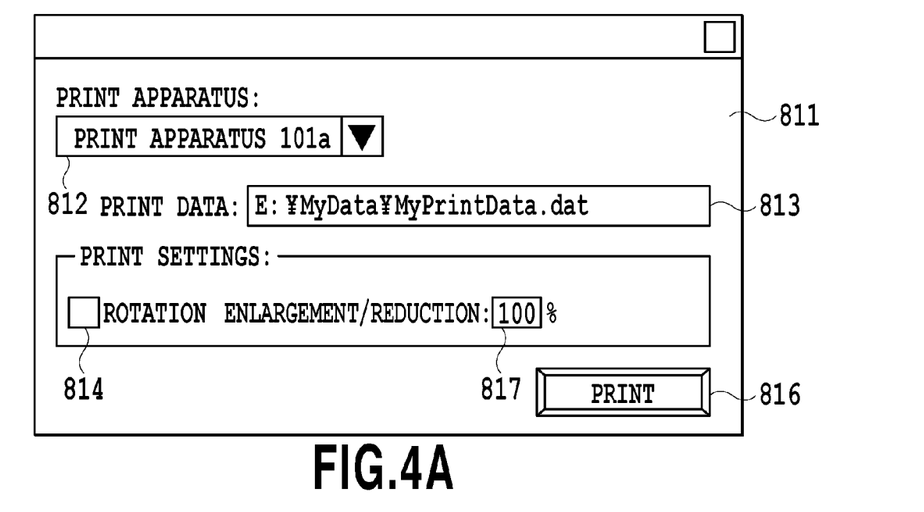
FIG. 4A is a view showing a display screen.
Figure 4B:
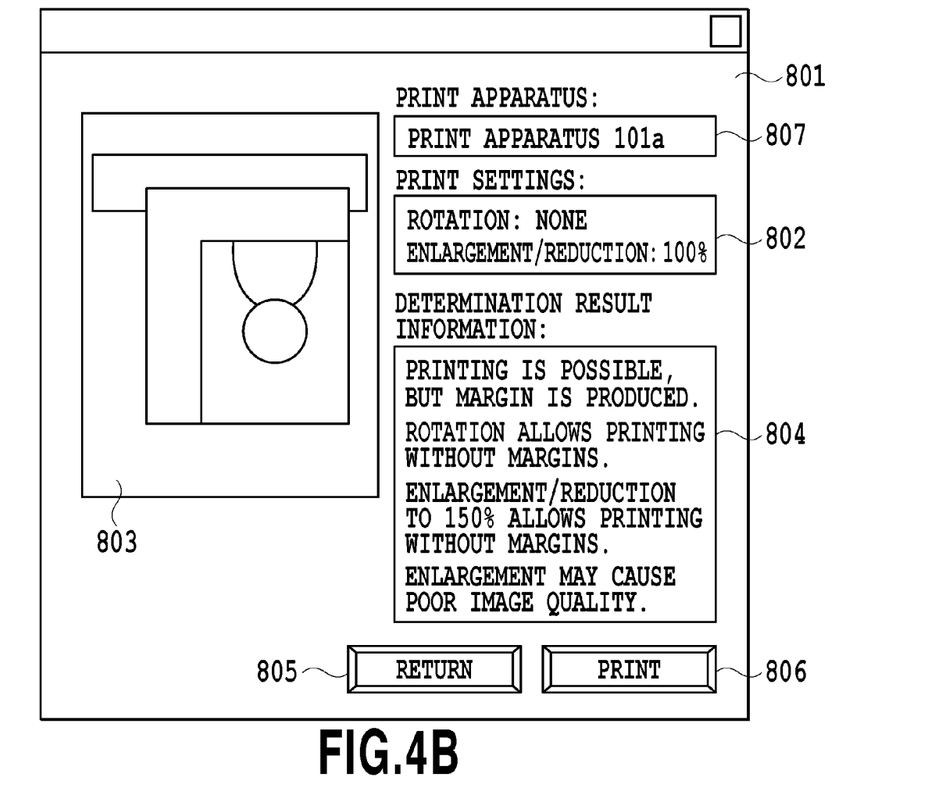
FIG. 4B is a view showing a display screen.

FIGS. 4A and 4B are views showing user interfaces according to the present embodiment. FIG. 4A shows a print setting screen 811 displayed on the monitor 206 and FIG. 4B shows the determination result information display screen 801 displayed on the monitor 206. The print setting screen 811 is a screen for setting print settings for a print apparatus, and the determination result information display screen 801 is a screen for displaying determination result information for a print apparatus.

As shown in FIG. 4A, on the print setting screen 811, a print apparatus selection combo box 812, a print data path edit box 813, a rotation checkbox 814, an enlargement/reduction edit box 817, and the print button 816 are displayed.

The print apparatus selection combo box 812 is used to select one print apparatus from a plurality of print apparatuses registered in the host device 102. Examples of the print apparatuses registered in the host device 102 include a print apparatus which can be recognized based on the program P1, a printer driver for which is installed in the host device 102. Any print apparatus may be used as long as it can be recognized based on the program P1.

In the print data path edit box 813, data to be printed is specified. In the rotation checkbox 814, whether to rotate the original, that is, whether to rotate the print position of the print data with respect to the sheet, is specified. In the enlargement/reduction edit box 817, enlargement/reduction of the original is set. A scaling factor for enlargement or reduction is inputted in percentages. As used herein, settings of the rotation and enlargement/reduction are referred to as print settings. The user selects the print button 816 to send a print instruction.

If the print button 816 is selected, in a case where printing without margins is possible by using the selected print apparatus, a printing operation starts, whereas in a case where printing without margins is not possible, the determination result information display screen 801 shown in FIG. 4B is displayed on the monitor 206.

As shown in FIG. 4B, on the determination result information display screen 801, a print apparatus display edit box 807, a print setting display part 802, a determination result information display part 804, a return button 805, a print button 806, and a print preview display part 803 are displayed.

In the print apparatus display edit box 807, the print apparatus selected by the user is displayed. On the print setting display part 802, print settings set on the print setting screen 811 are displayed. On the print preview display part 803, a print result that may be outputted if printing is performed by the print apparatus based on the print settings set on the print setting screen 811 is displayed. On the determination result information display part 804, determination result information is displayed.

The user checks the determination result information displayed on the determination result information display part 804 and selects the return button 805 if the user wants to change the print settings, or selects the print button 806 if the user wants to print without changing the print settings. In a case where the user selects the print button 806, a print instruction is sent. If the user selects the return button 805, the print setting screen 811 shown in FIG. 4A is displayed again on the monitor 206. In this manner, the user can change the print settings on the print setting screen 811 with reference to the determination result information displayed on the determination result information display part 804.

As described above, in a case where printing without margins is not possible, after checking the determination result displayed on the determination result information display part 804, the user can appropriately select from printing with the print settings changed and printing without changing the print settings.

Figure 5:
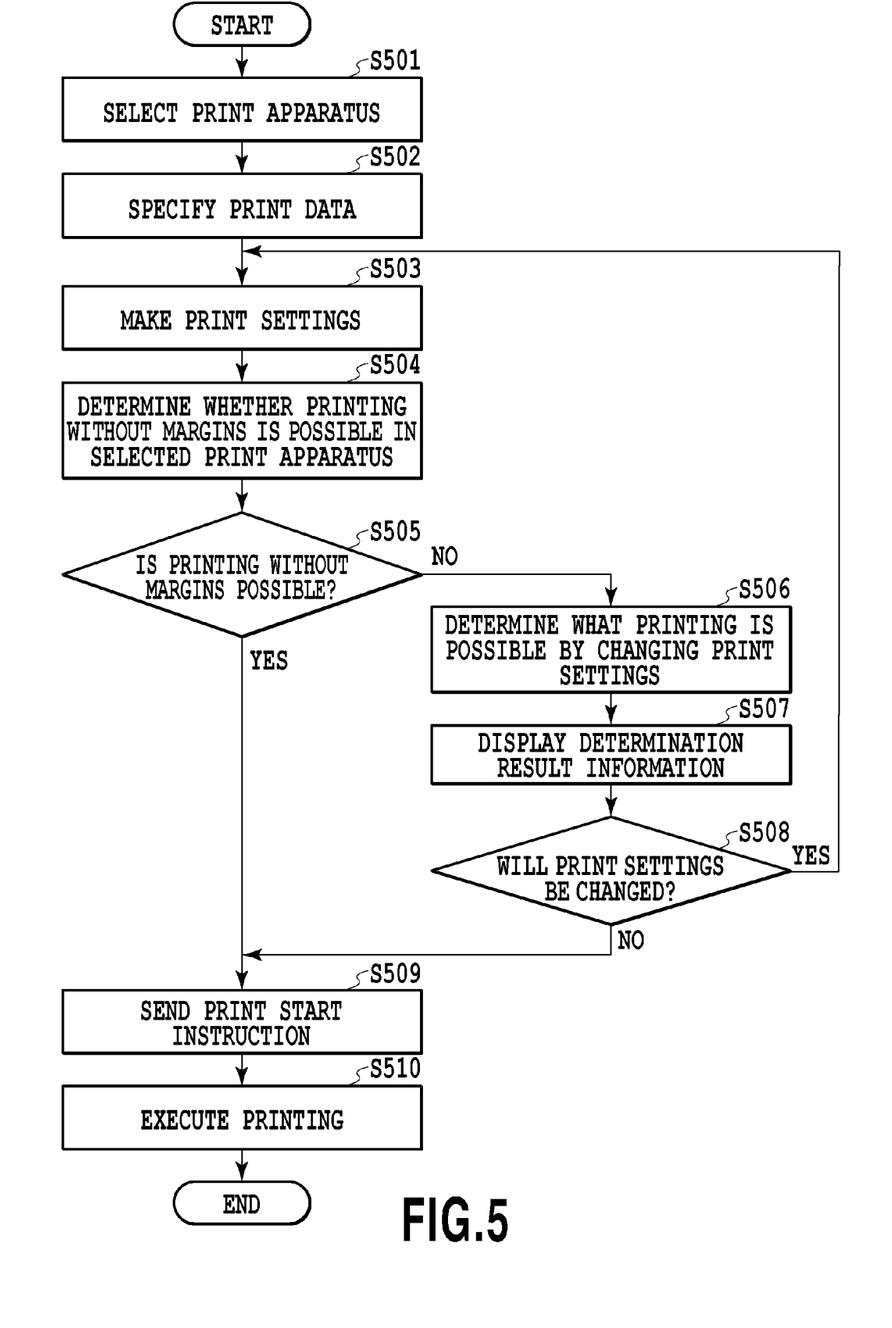
FIG. 5 is a flow chart showing the flow of processing that ends with execution of printing.

FIG. 5 is a flow chart showing the flow of processing that ends with execution of printing according to the present embodiment. If the user performs an operation for printing print data, the print setting screen 811 shown in FIG. 4A is displayed on the monitor 206. Accordingly, the processing shown in FIG. 5 starts. In the print apparatus selection combo box 812, the user selects one print apparatus to be used for printing from a plurality of print apparatuses (S501). Here, a description will be given of the case where a print apparatus 101a is selected from print apparatuses 101a to 101d.

The user specifies data to be printed in the print data path edit box 813 (S502). Further, the user makes print settings in the rotation checkbox 814 and the enlargement/reduction edit box 817 (S503). If the user selects the print button 816 on the print setting screen 811, the CPU 201 determines whether printing without margins is possible in the print apparatus 101a (S504). The flow of this determination processing will be described with reference to FIG. 6.

Figure 6:
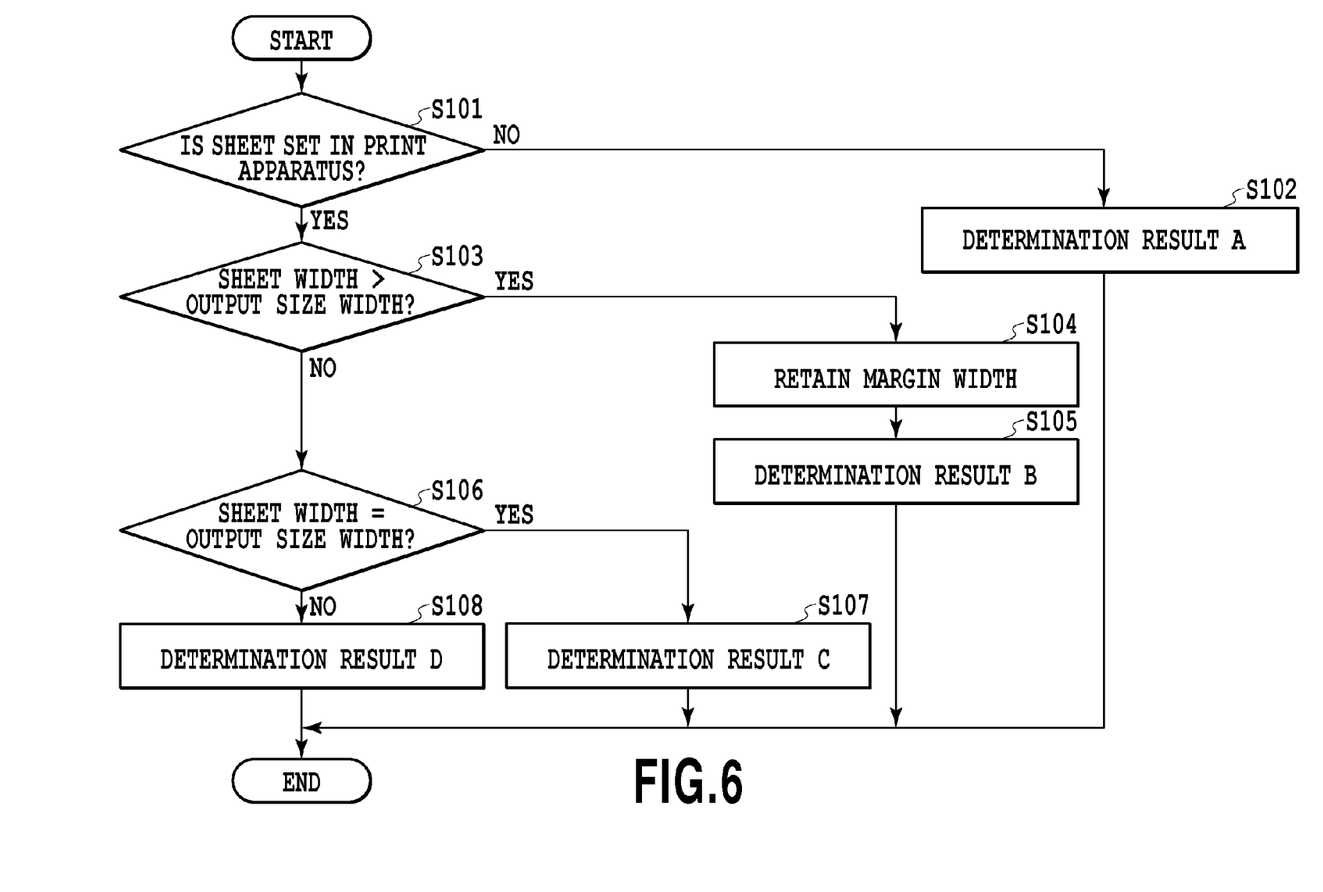
FIG. 6 is a flow chart showing the flow of processing to determine the presence or absence of a margin.
Figure 7:
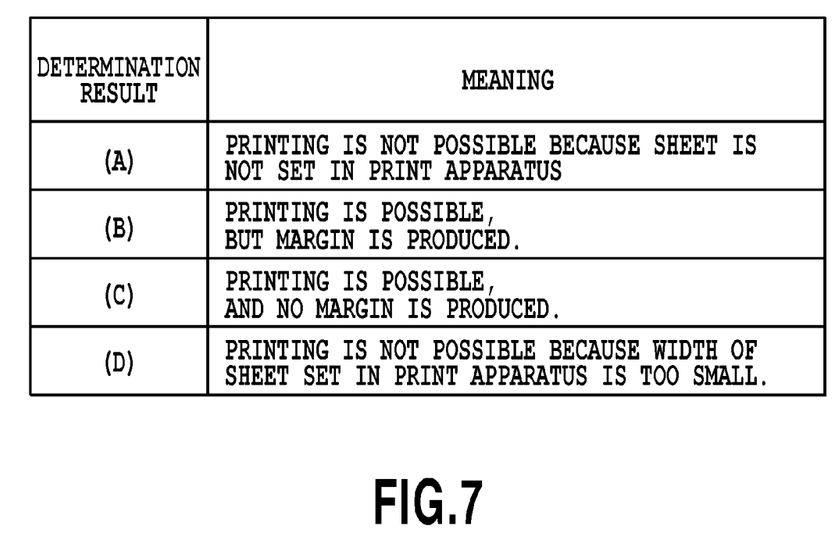
FIG. 7 is a table showing types of determination results.

FIG. 6 is a flow chart showing the flow of processing to determine whether printing without margins is possible. FIG. 7 is a table showing determination results and meanings thereof. As shown in FIG. 6, once the processing starts, the CPU 201 determines whether a sheet is set in the print apparatus 101a (S101). In a case where no sheet is set in the print apparatus 101a (No in S101), a determination result A shown in FIG. 7 is obtained (S102), and the processing is finished.

In a case where a sheet is set in the print apparatus 101a (YES in S101), it is determined whether the width of the sheet is greater than the width of an output size (S103). In a case where the width of the sheet is greater than the width of the output size (YES in S103), information on the width of a margin is retained in the memory 202 or the auxiliary storage 203 (S104). The information on a margin is used in S210 in FIG. 8 which will be described later. In this case (YES in S103), a determination result B is obtained (S105), and the processing is finished. As shown in FIG. 7, the determination result B means that printing is possible but a margin is produced.

Referring back to FIG. 6, in a case where the width of the sheet is not greater than the width of the output size (NO in S103), it is determined whether the width of the sheet and the width of the output size are identical (S106). In a case where the width of the sheet and the width of the output size are identical (YES in S106), a determination result C is obtained (S107), and the processing is finished. As shown in FIG. 7, the determination result C means that printing without margins is possible.

Referring back to FIG. 6, in a case where the width of the sheet and the width of the output size are not identical (NO in S106), a determination result D is obtained (S108), and the processing is finished. As shown in FIG. 7, the determination result D means that print data cannot be printed because the width of the output size is greater than the width of the sheet, and the sheet is not wide enough to have the print data printed thereon.

Refer back to FIG. 5. Based on the determination result of the processing described with reference to FIG. 6, it is determined whether printing without margins is possible (S505). In a case where printing without margins is possible (YES in S505), that is, in a case where a determination result C is obtained, the determination result information display screen 801 is not displayed, and a print start instruction is sent (S509). This instruction is transmitted to the print apparatus 101a via the network cable 103, and printing in the print apparatus 101a is performed according to the print settings set in S503 (S510). Then, the present processing is finished.

On the other hand, in a case where printing without margins is not possible (NO in S505), that is, in a case where a determination result other than the determination result C is obtained, the CPU 201 determines whether printing is possible after the print settings are changed (S506). In the present embodiment, a method for allowing printing without margins or a method for reducing the area of margins is sought, and the result is determined as determination result information. The flow of this processing will be described with reference to FIG. 8.

Figure 8:
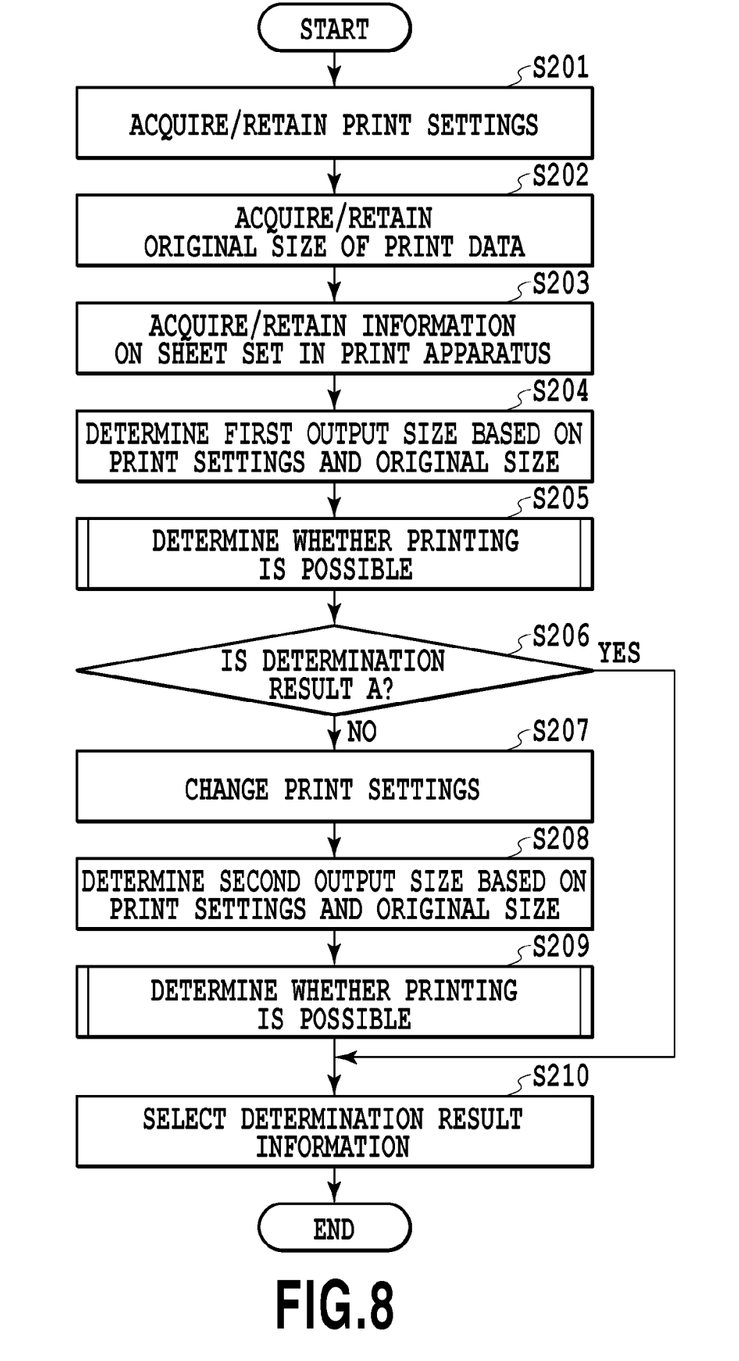
FIG. 8 is a flow chart showing the flow of processing that ends with selecting determination result information.
Figure 9A:
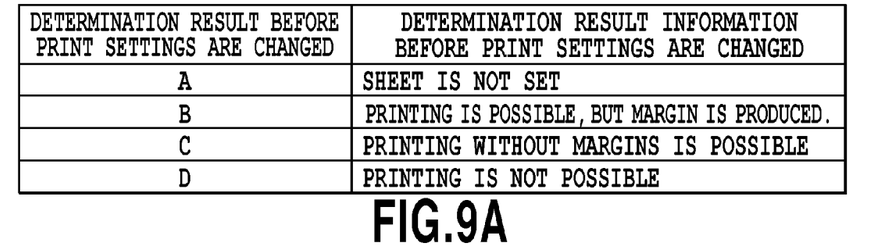
FIG. 9A is a table for selecting determination result information.
Figure 9B:
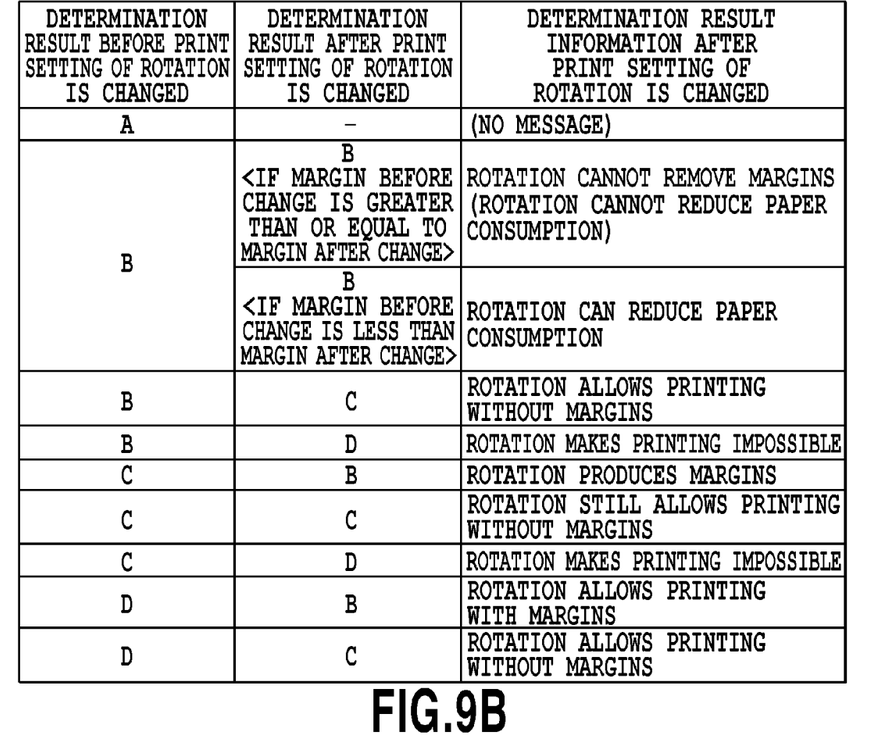
FIG. 9B is a table for selecting determination result information.

FIG. 8 is a flow chart showing the flow of processing that ends with selecting determination result information to be displayed on the determination result information display part 804. FIGS. 9A and 9B show exemplary tables to be referenced in selecting determination result information.

As shown in FIG. 8, once the processing starts, the CPU 201 acquires the print settings set by the user on the print setting screen 811, and the print settings are retained in the memory 202 or the like (S201). It should be noted that the method for acquiring print settings is not limited to this method. For example, print settings may be acquired by making a user specify a data file in which print settings are specified. Alternatively, settings specified in advance may be acquired as the print settings.

Next, the CPU 201 acquires and retains the size of an original (S202). As the size of the original, the size set to the original may be used, for example, or a user interface for inputting the size of the original may be provided for the user to input the size of the original. Here, the method for acquiring the size of the original is not particularly limited.

The width of the sheet set in the print apparatus 101a is acquired and retained (S203). Based on the print settings and the size of the original, a first output size (defined by the width and the height of the output size) is determined (S204). Based on the width of the sheet and the first output size, a first margin width is determined. Then, through the processing shown in FIG. 6, it is determined whether printing without margins is possible for the first output size (S205). As a result, a first determination result is obtained.

The CPU 201 determines whether the first determination result is a determination result A (S206). In a case where the first determination result is the determination result A (YES in S206), based on the first determination result, determination result information is selected with reference to the tables shown in FIGS. 9A and 9B (S210), and the present processing is finished.

In a case where the first determination result is not the determination result A (NO in S206), the print settings are changed (S207). For example, in a case where the print settings include "ROTATION: NONE," this setting is changed to "ROTATION: YES," and in a case where enlargement/reduction is not specified, the scaling factor is changed to an appropriate one. Based on the print settings as changed and the size of the original, a second output size is determined (S208). Based on the second output size and the width of the sheet, a second margin width is determined.

Next, through the processing shown in FIG. 6, it is determined whether printing without margins is possible for the second output size (S209). As a result, a second determination result is determined. Then, based on the first margin width, the first determination result, the second margin width, and the second determination result, determination result information is selected with reference to the tables shown in FIGS. 9A to 9C (S210), and the present processing is finished.

Refer back to FIG. 5. After the determination result information is selected through the processing shown in FIG. 8, the determination result information display screen 801 is displayed, and the selected determination result information is displayed on the determination result information display part 804 of the determination result information display screen 801 (S507). After checking the displayed determination result information, the user determines whether to change the print settings (S508).

In a case where the user selects the return button 805 (YES in S508), the print setting screen 811 is displayed again. The user changes and sets the print settings in the rotation checkbox 814 and the enlargement/reduction edit box 817 (S503). Then, the above-described processing is performed again (S504 and S505). It should be noted that a description is given of the case where the selected print apparatus is not changed, but a print apparatus to be used may be changed.

Then, it is determined whether printing without margins is possible (S505). If printing without margins is possible (YES in S505), and if the user selects the print button 816, a print start instruction is sent (S509), and printing is performed (S510). Then, the present processing is finished. If printing without margins is not possible (NO in S505), the above processing is performed (S506 to S508).

In a case where the user selects the print button 806 (NO in S508), a print start instruction from the user is sent (S509). This print start instruction is transmitted to the print apparatus 101*a* via the network cable 103, and printing in the print apparatus 101*a* is performed according to the print settings set in S503 (S510). Then, the present processing is finished.

Figure 9C:
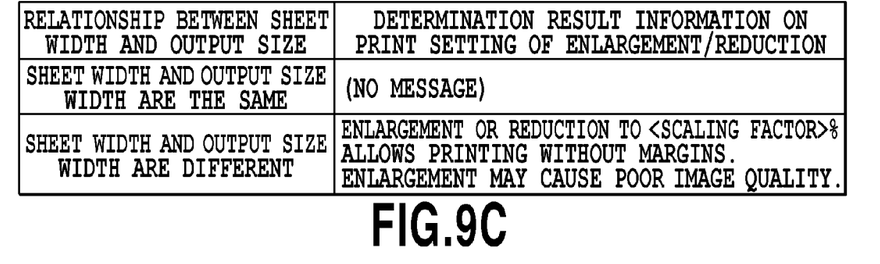
FIG. 9C is a table for selecting determination result information.

FIGS. 9A to 9C are exemplary tables to be referenced in selecting determination result information. FIG. 9A is a table showing determination results before the print settings are changed (first determination result) and the corresponding determination result information. In the present embodiment, the determination result information selected by using the table shown in FIG. 9A is displayed on an upper portion of the determination result information display part 804 shown in FIG. 4B.

FIG. 9B is a table showing determination results before the print setting of rotation is changed, determination results after the print setting of rotation is changed, and the corresponding determination result information after the print setting of rotation is changed. The CPU 201 refers to a row corresponding to a combination of the determination result in the column "DETERMINATION RESULT BEFORE PRINT SETTING OF ROTATION IS CHANGED" and the determination result in the column "DETERMINATION RESULT AFTER PRINT SETTING OF ROTATION IS CHANGED" in this table. The information in the column "DETERMINATION RESULT INFORMATION" is selected as the information displayed on the determination result information display part 804.

However, only in a case where both of "DETERMINATION RESULT BEFORE PRINT SETTING OF ROTATION IS CHANGED" and "DETERMINATION RESULT AFTER PRINT SETTING OF ROTATION IS CHANGED" are a determination result B, "MARGIN WIDTH BEFORE PRINT SETTING OF ROTATION IS CHANGED" and "MARGIN WIDTH AFTER PRINT SETTING OF ROTATION IS CHANGED" are compared to select the determination result information to be displayed. More specifically, the CPU 201, in S210 of FIG. 8, uses the margin width retained in S105 of FIG. 6 to select the determination result information to be displayed on the determination result information display part 804.

It should be noted that as shown in FIG. 9B, the determination result information in the table shown in FIG. 9B includes also information on paper consumption, and by providing this information for the user, it is possible to reduce paper consumption depending on the user's selection.

In the present embodiment, the determination result information selected by using the table shown in FIG. 9B is displayed on a center portion of the determination result information display part 804 shown in FIG. 4B.

FIG. 9C is a table showing the relationship between a sheet width and an output size and the corresponding determination result information on the print setting of enlargement/reduction. In the present embodiment, the determination result information selected by using the table shown in FIG. 9C is displayed on a lower portion of the determination result information display part 804 shown in FIG. 4B.

As shown in FIGS. 9B and 9C, the tables include also information on an effect of the change in the print settings. It should be noted that the display position of the determination result information selected by using each table in the determination result information display part 804 is not limited to the position shown in FIG. 4B.

As described above, in the present embodiment, in a case where printing is performed with the selected print apparatus, based on the size of the sheet set in the print apparatus, the size of the original, and the print settings set by the user, it is determined whether printing without margins is possible by using this print apparatus. In the present embodiment, it is possible to lighten the load on the user by displaying the determination results, the information on processing needed to adjust the size of the output product of print data to be closer to the size of the sheet, the expected results of the processing, and the like.

In the present embodiment, a description is given of the case where the host device 102 performs the above processing. However, the above processing may be performed by a print apparatus.

It should be noted that the function of the present embodiment may be implemented also by the following configuration. More specifically, a program code for performing the processing of the present embodiment may be provided for the system or apparatus, and the function of the present embodiment may be implemented by a computer (CPU or MPU) in the system or apparatus which executes the program code. In this case, the program code itself read from a storage medium implements the function of the above-described embodiment, and the storage medium having the program code stored therein also implements the function of the present embodiment.

Further, a program code for implementing the function of the present embodiment may be executed by a single computer (CPU or MPU) or a plurality of computers working together. Furthermore, a program code may be executed by a computer, or hardware, such as a circuit, may be provided to implement the function of the program code. Further, a part of a program code may be implemented by hardware, and the rest of the program code may be executed by a computer.

Second Embodiment

In the present embodiment, a description will be given of a method in which determination result information for a plurality of print apparatuses is displayed and a print apparatus used for printing is selected from the plurality of print apparatuses. Note that a description of the same configuration as the one in the first embodiment will be omitted.

Figure 10A:
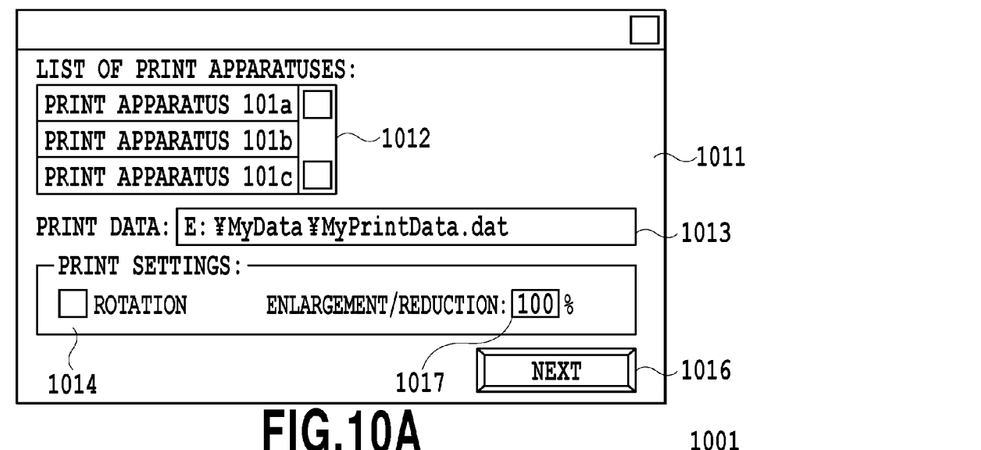
FIG. 10A shows a display screen.
Figure 10B:
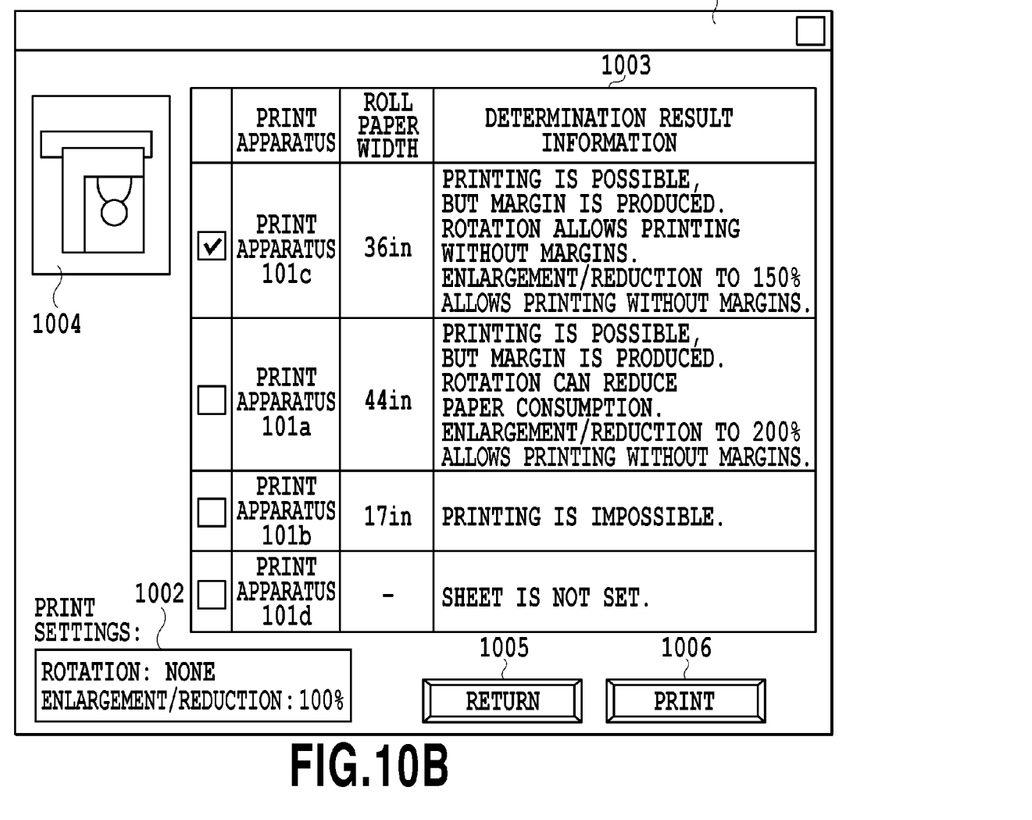
FIG. 10B shows a display screen.

FIGS. 10A and 10B are views showing user interfaces according to the present embodiment. FIG. 10A shows a print setting screen 1011 displayed on a monitor 206 and FIG. 10B shows a determination result information display screen 1001 displayed on the monitor 206. The print setting screen 1011 is a screen for setting print settings, and the determination result information display screen 1001 is a screen for displaying determination result information in the plurality of print apparatuses.

As shown in FIG. 10A, the print setting screen 1011 displays a list of print apparatuses 1012. In the list of print apparatuses 1012, a plurality of print apparatuses registered in a host device 102 are displayed. In the present embodiment, print apparatuses 101a to 101d are registered in the host device 102.

A scroll button is provided near the list of print apparatuses 1012. In a case where all of the print apparatuses registered in the host device 102 do not fit into a displayed list box, the scroll button is operated to have a hidden print apparatus displayed so that a user can check the print apparatuses registered in the host device 102. Here, if a next button 1016 is selected, the determination result information display screen 1001 shown in FIG. 10B is displayed.

On the determination result information display screen 1001 shown in FIG. 10B, a determination result information list display part 1003 is displayed, in which determination result information corresponding to each of the print apparatuses 101a to 101d is displayed. On the determination result information list display part 1003, a plurality of checkboxes corresponding to the plurality of print apparatuses are displayed. In a case where one of the checkboxes is selected by a user's operation, a print preview based on the determination result information for the print apparatus corresponding to the selected checkbox is displayed on a print preview display part 1004.

If a print button 1006 is selected, printing is performed by using the print apparatus corresponding to the selected checkbox. If a return button 1005 is selected, the print setting screen 1011 is displayed.

Figure 11:
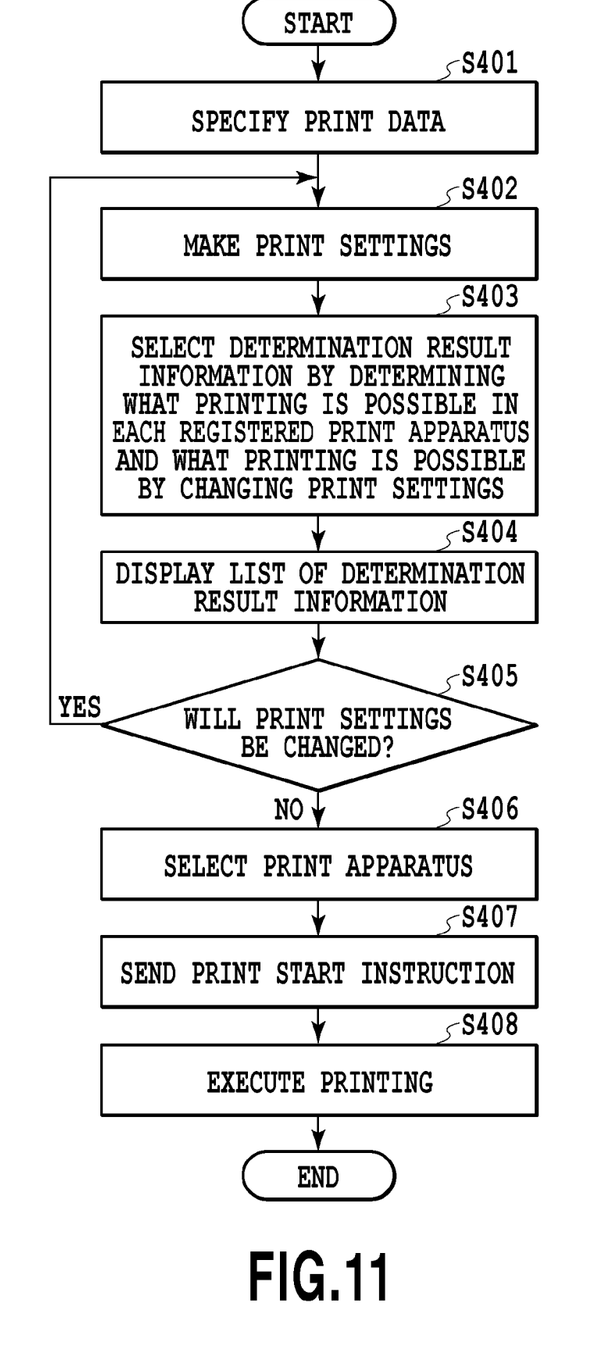
FIG. 11 is a flow chart showing the flow of processing that ends with execution of printing.

FIG. 11 is a flow chart showing the flow of processing that ends with execution of printing according to the present embodiment. The processing in S401 and S402 shown in FIG. 11 is the same as that in S502 and S503 shown in FIG. 5. Accordingly, a description of the processing will be omitted. After print settings are set (S402), the determination on whether printing without margins is possible, which has been described with reference to FIG. 6, is performed for each of the plurality of print apparatuses, and determination result information is selected according to the flow of processing shown in FIG. 8 (S403).

Figure 12:
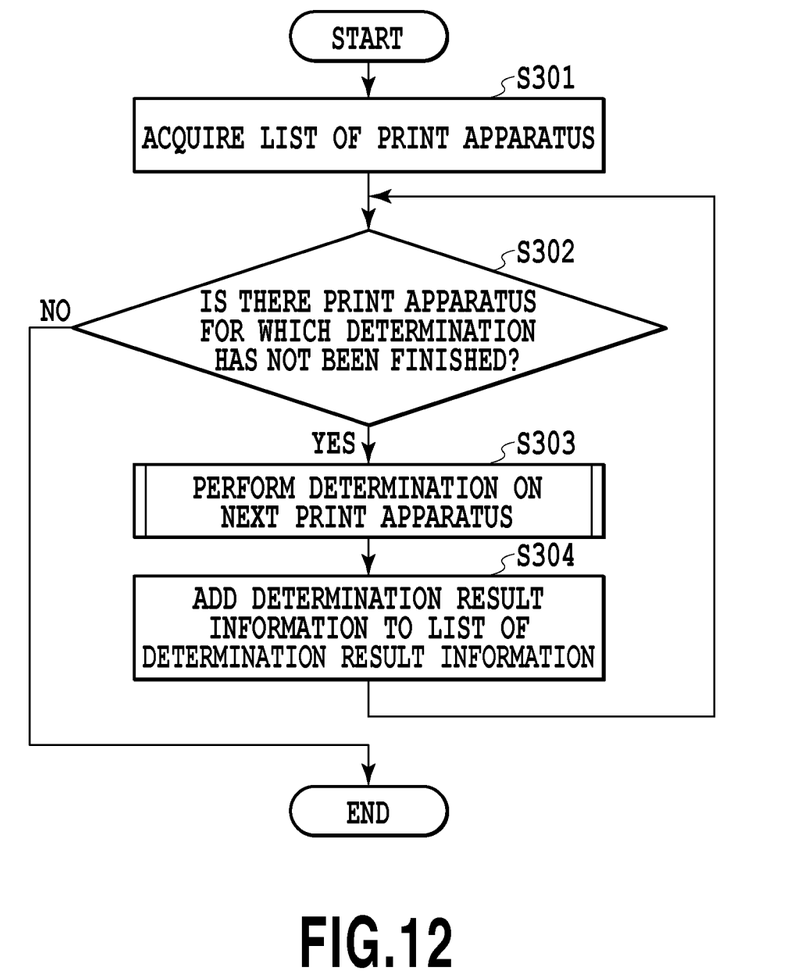
FIG. 12 is a flow chart showing the flow of processing to check whether determination has been performed.

FIG. 12 is a flow chart showing the flow of processing of determining whether determination result information has been selected for each of the plurality of print apparatuses. As shown in FIG. 12, first, a CPU 201 acquires a list of print apparatuses that can perform printing (S301). It is determined whether there is any print apparatus for which determination result information has not been selected among the print apparatuses in the acquired list (S302).

In a case where there is no print apparatus for which determination result information has not been selected (NO in S302), the processing is finished. In a case where there is a print apparatus for which determination result information has not been selected (YES in S302), determination result information is selected for the print apparatus for which determination result information has not been selected (S303), and the selected determination result information is added to a determination result information list (S304). Then, the above processing is repeated until determination result information is selected for all of the print apparatuses.

Refer back to FIG. 11. The determination result information list created through the above processing is displayed on the determination result information list display part 1003 (S404).

After checking the displayed determination result information, the user determines whether to change the print settings. In a case where the print settings are changed (YES in S405), the user selects the return button 1005 to return to the print setting screen 1011, and the print settings are changed and set (S402). Then, the above processing is performed again (S403 to S405).

In a case where the print settings are not changed (NO in S405), the user selects a print apparatus used for printing by selecting the checkbox on the determination result information list display part 1003 (S406).

Then, if the user selects the print button 1006, a print start instruction is sent (S407), and by using the selected print apparatus, printing is performed based on the print settings set in S402 (S408). Then, the present processing is finished.

It should be noted that on the determination result information list display part 1003 shown in FIG. 10B, displaying/hiding of the determination result information may be switched according to the determination result. Further, as shown in FIG. 10B, in the present embodiment, the determination result information corresponding to each print apparatus is displayed in the order of determination result information according to a determination result before change, determination result information after the print setting of rotation is changed, and determination result information on the print setting of enlargement/reduction. However, the order of displaying the determination result information is not limited to that shown in FIG. 10B. The order of displaying may be changed.

As described above, in the present embodiment, displaying determination result information for each of the print apparatuses can provide to the user information indicating which print apparatus is suitable for printing. More specifically, based on the size of the sheet set in the print apparatus, the size of the original, and the print settings set by the user, it is determined whether printing without margins is possible with respect to each print apparatus. Also in the present embodiment, providing the information on the determination result for the user can reduce a load on the user.

Other Embodiments

In the above-described embodiments, the determination result information is displayed in letters. However, the determination result information does not always need to be displayed in letters as long as the user can recognize the content of the determination result information. For example, the determination result information may be displayed with an icon representing the content of the determination result information. Furthermore, the determination result information does not need to be visible as long as it can be reported to the user. For example, the user may be notified of the determination result information by sound.

Furthermore, each flow of processing is not limited to the examples described in the above embodiments. For example, the order of processing may be changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075542 filed Apr. 1, 2014, which is hereby incorporated by reference wherein in its entirety.

What is claimed is:

1. A print control apparatus for controlling a print apparatus to print an image on a sheet based on print data, the print control apparatus comprising:
    a memory configured to store a program; and
    a processor configured to execute the program stored in the memory,
    wherein in a case where a user designates from a plurality of print apparatuses a print apparatus to be used for printing of the image, the processor determines whether a width of a sheet set in the designated print apparatus corresponds to the width of the image,
    wherein in a case where it is determined that the width of the sheet set in the designated print apparatus does not correspond to the width of the image, or the user does not designate a print apparatus from the plurality of print apparatuses, (a) the processor acquires, for the designated print apparatus or each of the plurality of print apparatuses, information relating to a rotation result in a case that the image is rotated with respect to a sheet set in the designated print apparatus or the plurality of print apparatuses, and (b) the processor notifies a user of the rotation result based on the information acquired for the designated print apparatus or each of the plurality of print apparatuses,
    wherein in a case where the rotation result is notified based on the information acquired for each of the plurality of print apparatuses, the processor controls a print apparatus selected from the plurality of print apparatuses to print the image, in accordance with an instruction by the user,
    wherein in a case where the rotation result is notified based on the information acquired for the designated print apparatus, the processor controls the designated print apparatus to print the image which is rotated in accordance with an instruction by the user, and
    wherein in a case where the user designates the print apparatus and it is determined that the width of the sheet set in the designated print apparatus corresponds to the width of the image, the processor (a) does not notify the user of the rotation result, and (b) controls the designated print apparatus to print the image on the sheet.

2. The print control apparatus according to claim 1, wherein the rotation result includes margin information relating to a margin on the sheet in a case that the image is rotated and printed on the sheet.

3. The print control apparatus according to claim 1, wherein the processor further notifies the user of an enlargement result in a case that the print data is enlarged to adjust a size of the print data to be closer to a size of the sheet.

4. The print control apparatus according to claim 1, wherein the processor predicts a print result in a case of printing the print data without performing rotation of the image, and
    wherein the processor notifies the user of the rotation result based on the acquired information and the predicted print result.

5. The print control apparatus according to claim 1, wherein the processor causes a display unit to display the rotation result.

6. The print control apparatus according to claim 5, wherein the processor causes the display unit to display respective rotation results for the plurality of print apparatuses.

7. The print control apparatus according to claim 1, comprising the print apparatus.

8. The print control apparatus according to claim 1, wherein the sheet set in the print apparatus is a roll sheet, and
    wherein the processor notifies the user of the rotation result, based on a width of the sheet and a size of the image in a case that the image is rotated.

9. The print control apparatus according to claim 8, wherein the processor acquires, as the information, a width of the sheet and a size of the image in a case that the image is rotated.

10. A non-transitory storage medium for storing a program for causing a computer to function as a print control apparatus, the print control apparatus being for controlling a print apparatus to print an image on a sheet based on print data, wherein the program causes the computer to:
    in a case where a user designates from a plurality of print apparatuses a print apparatus to be used for printing of the image, determine whether a width of a sheet set in the designated print apparatus corresponds to the width of the image,
    in a case where it is determined that the width of the sheet set in the designated print apparatus does not correspond to the width of the image, or the user does not designate a print apparatus from the plurality of print apparatuses, (a) acquire, for the designated print apparatus or each of the plurality of print apparatuses, information relating to a rotation result in a case that the image is rotated with respect to a sheet set in the designated print apparatus or the plurality of print apparatuses, and (b) notify a user of the rotation result based on the information acquired for the designated print apparatus or each of the plurality of print apparatuses;

in a case where the rotation result is notified based on the information acquired for each of the plurality of print apparatuses, control a print apparatus selected from the plurality of print apparatuses to print the image, in accordance with an instruction by the user;

in a case where the rotation result is notified based on the information acquired for the designated print apparatus, control the designated print apparatus to print the image which is rotated in accordance with an instruction by the user; and in a case where the user designates the print apparatus and it is determined that the width of the sheet set in the designated print apparatus corresponds to the width of the image, control the designated print apparatus to print the image on the sheet without notifying the user of the rotation result.

11. A method for controlling a print apparatus to print an image on a sheet based on print data, the method comprising the steps of:

in a case where a user designates a print apparatus to be used for printing of the image from a plurality of print apparatuses, determining whether a width of a sheet set in the designated print apparatus corresponds to the width of the image;

in a case where it is determined that the width of the sheet set in the designated print apparatus does not correspond to the width of the image, or the user does not designate a print apparatus from the plurality of print apparatuses, (a) acquiring, for the designated print apparatus or each of the plurality of print apparatuses, information relating to a rotation result in a case that the image is rotated with respect to a sheet set in the designated print apparatus or the plurality of print apparatuses, and (b) notifying a user of the rotation result based on the information acquired for the designated print apparatus or each of the plurality of print apparatuses;

in a case where the rotation result is notified based on the information acquired for each of the plurality of print apparatuses, controlling a print apparatus selected from the plurality of print apparatuses to print the image, in accordance with an instruction by the user;

in a case where the rotation result is notified based on the information acquired for the designated print apparatus, controlling the designated print apparatus to print the image which is rotated in accordance with an instruction by the user; and in a case where the user designates the print apparatus and it is determined that the width of the sheet set in the designated print apparatus corresponds to the width of the image, controlling the designated print apparatus to print the image on the sheet without notifying the user of the rotation result.

12. The method for controlling a print apparatus according to claim 11, wherein the rotation result includes margin information relating to a margin on the sheet in a case that the image is rotated and printed on the sheet.

13. The method for controlling a print apparatus according to claim 11, wherein an enlargement result, in a case that the print data is enlarged to adjust a size of the print data to be closer to a size of the sheet, is further notified in the notifying step.

14. The method for controlling a print apparatus according to claim 11, further comprising a predicting step of predicting a print result in a case of printing the print data without performing rotation of the image, wherein in the notifying step, the rotation result is notified based on the acquired information and the print result predicted in the predicting step.

15. The method for controlling a print apparatus according to claim 11, wherein in the notifying step, the rotation result is displayed on a display unit.

16. The method for controlling a print apparatus according to claim 15, wherein in the notifying step, respective rotation results for the plurality of print apparatuses are displayed on the display unit.

17. The method according to claim 11, wherein the sheet set in the print apparatus is a roll sheet, and wherein in the notifying step, the rotation result is notified based on a width of the sheet and a size of the image in a case that the image is rotated.

18. The method according to claim 17, wherein in the acquiring step, a width of the sheet and a size of the image in a case that the image is rotated are acquired as the information.

* * * * *